United States Patent [19]

Weigland

[11] Patent Number: 5,108,511
[45] Date of Patent: Apr. 28, 1992

[54] NON-EMULSION MASONRY CEMENT ADDITIVES AND METHOD OF PRODUCING MASONRY CEMENT COMPOSITIONS CONTAINING SAME

[75] Inventor: Willis A. Weigland, Chelmsford, Mass.

[73] Assignee: W.R. Grace & Co.-Conn., New York, N.Y.

[21] Appl. No.: 514,987

[22] Filed: Apr. 26, 1990

[51] Int. Cl.⁵ .................. C04B 24/2; C04B 24/8
[52] U.S. Cl. ........................... 106/728; 106/664; 106/666; 106/719; 106/720; 106/724; 106/730
[58] Field of Search ............... 106/664, 666, 719, 720, 106/724, 730

[56] References Cited

U.S. PATENT DOCUMENTS

| | | | |
|---|---|---|---|
| 2,358,776 | 9/1944 | Goldstein et al. | 106/666 |
| 3,332,791 | 7/1967 | Steinberg et al. | 106/92 |
| 3,885,985 | 5/1975 | Serafin et al. | 106/315 |
| 4,047,967 | 9/1977 | Majidzadeh et al. | 106/90 |
| 4,094,691 | 6/1978 | Moraru et al. | 106/95 |
| 4,126,470 | 11/1978 | Braun et al. | 106/95 |
| 4,129,449 | 12/1978 | Kojima et al. | 106/95 |
| 4,211,572 | 7/1980 | Wagner | 106/90 |
| 4,265,674 | 5/1981 | Debus et al. | 106/314 |
| 4,284,433 | 8/1981 | Aignesber et al. | 106/90 |
| 4,286,992 | 9/1981 | Galer et al. | 106/90 |
| 4,333,441 | 5/1982 | Bohmer et al. | 525/54.23 |
| 4,375,987 | 3/1983 | Lange et al. | 106/95 |
| 4,402,752 | 9/1983 | Chesney, Jr. | 106/93 |
| 4,447,267 | 5/1984 | Chesney et al. | 106/93 |
| 4,502,887 | 3/1985 | Tsuda | 106/93 |
| 4,504,318 | 3/1985 | Matsuda et al. | 106/90 |
| 4,707,188 | 11/1987 | Tsuda et al. | 106/93 |
| 4,753,679 | 6/1988 | Damiano et al. | 106/95 |
| 4,778,529 | 10/1988 | Barker et al. | 106/93 |
| 4,787,936 | 11/1988 | Suzuki et al. | 106/90 |
| 4,792,360 | 12/1988 | Pierce et al. | 106/90 |
| 4,828,624 | 5/1989 | Valle | 106/90 |

*Primary Examiner*—William R. Dixon, Jr.
*Assistant Examiner*—C. M. Bonner
*Attorney, Agent, or Firm*—William L. Baker; John J. Wasatonic

[57] ABSTRACT

Masonry cement additives are provided which, when interground with Portland cement, produce a masonary cement having superior workability, plasticity and board life, while unexpectedly also having advantageously low levels of entrained air. The additives of the invention enable the masonry cement producer to obtain these desired properties without replacing the limestone component of the masonry cement with more costly lime.

The additives of the invention may be provided in aqueous solution, and thus, unlike emulsion additives, are stable for long periods of storage, even when subjected to extreme temperature excursions and cycling.

The additives of the invention comprise a salt of stearic acid; a set retarding carbohydrate; an ethylenic glycol elected from the group consisting of mono-, di-, tri-, and tetraethylene glycols; and a cellulose ether.

4 Claims, No Drawings

NON-EMULSION MASONRY CEMENT ADDITIVES AND METHOD OF PRODUCING MASONRY CEMENT COMPOSITIONS CONTAINING SAME

BACKGROUND OF THE INVENTION

The present invention relates to non-emulsion additives for masonry cements. More particularly, the invention relates to a non-emulsion additive which, when used in masonry cements, provides masonry cement compositions having very low levels of air entrainment, while still possessing good workability and water retention.

Masonry cements are produced by intergrinding Portland cement (containing gypsum for proper setting time regulation), with, generally, from about 35 to 65%, based on the total weight, of a solid material such as limestone, chalk, talc, pozzolans, clay, gypsum, or combinations of such. Limestone is most often the ingredient interground with the Portland cement because of its low cost and good plasticity enhancing properties. Such masonry cements are ground to a greater degree of fineness than most Portland cements intended for use in structural concretes. The finer grind of masonry cements improves the plasticity of the finished mortar products.

Portland masonry cements ar compositions produced particularly for use by masons in the bonding of bricks, blocks and the like. Such cements are typically mixed prior to use with a fine aggregate, usually sand, and water. It is desirable that the wet mortar have a high degree of plasticity for working (e.g. troweling) by the mason, as well as other desirable properties such as good "board life" (i.e. a long working time), water-repellancy, etc. It is further desired that these cements possess good compressive strength, such that the structures built with the masonry cement will have good structural integrity.

The balance of workability vs. compressive strength which is obtained with a given masonry cement composition generally depends upon the level of entrained air in the cement composition. Masonry cements containing high levels of entrained air generally possess good workability and water retention, but relatively low compressive strength, while cements containing low levels of air generally possess good compressive strength, but are difficult for the mason to handle.

However, masonry cements having both low levels of entrained air, and hence good compressive strength, in combination with good workability can often be obtained by replacing some or all of the limestone component of the masonry cement with lime, a product obtained by heating naturally occuring limestone to form calcium oxide. However, masonry cement producers usually own, and are located at, limestone quarries, thus making limestone readily available and very inexpensive, whereas lime is generally costly, and must either be manufactured from the limestone by the cement producer or purchased from outside sources.

There is currently a trend in the industry toward implementing construction codes which would require lower levels of entrained air in masonry cements. If it is necessary to increase the level of lime used in masonry cements in order to meet these requirements the cost to the masonry cement producer will increase dramatically. Thus it would be very advantageous to producers of masonry cements to have an alternative, more economical method of reducing the air content in masonry cements, while retaining good workability.

Additive products are sold for mixture with masonry cements to enhance various properties of the cements, e.g. to improve the plasticity, water repellancy and set retardation of the masonry cement composition. It is common practice to mix such additive products with the cement during the intergrinding of the cement with the gypsum, limestone, etc.

In U.S. Pat. Nos. 3,865,601 and 3,885,985, the disclosures of which are incorporated herein by reference, additive products of the above type are described. The additives described therein comprise an aqueous oil-in-water emulsion containing water, a water insoluable, water-repelling acid component (e.g. tall oil, an emulsifier (e.g. a salt of such acid), and a setting time retarding agent (e.g. sucrose). This additive product is advantageously dispersible in water which reduces the risk of it being overdosed. The additive may also contain an air-entraining agent as an additional optional component.

An improved emulsion additive product is described in U.S. Pat. No. 4,375,987. In addition to the above-described constituents, this additive further comprises an emulsion stabilizer, (e.g. a glycol), which prevents the oil-in-water emulsion from destabilizing when exposed to freezing temperatures during shipping or storage prior to use.

The emulsion additive products described in the aforementioned patents have been successfully used to improve the water-repellancy, set-retardation, and plasticity of Portland masonry cements. However, in order to obtain optimal plasticity and workability and extended board life it is sometimes necessary to further add a water retention agent, such as a cellulose ether, during the grinding process. Such water retention agents generally entrain large quantities of air in the masonry cement, which, as described above, is undesirable in many applications. Furthermore, water retention agents cause the emulsion additives described above to destabilize and hence must be added as a separate feed stream, often as a dry powder. This method of addition is inconvenient and may increase the risk of overdosing the batch with the water retention agent.

Emulsion additives for masonry cements also have the disadvantage of often destabilizing (i.e. the emulsion "breaks") during storage. This may occur even when the additive contains a stabilizing component such as a glycol if the emulsion is exposed to severe temperature excursions or long-term thermal cycling. The destabilization generally occurs during storage or shipment of the emulsion, and usually renders the additive unusable.

Emulsion additives are also less economical to produce than a solution or suspension-type additive would be, as an additional manufacturing step is required to emulsify the additive.

Thus, it is desired to provide additives for masonry cements which, when interground with the cement, would produce a masonry cement having excellent workability and plasticity, in combination with an advantageously low air content and thus good compressive strength. It is further desired that these additives be provided as aqueous solutions rather than oil-in-water emulsions.

SUMMARY OF THE INVENTION

The present invention provides non-emulsion additives which, when interground with Portland cement, produce a superior masonry cement having excellent workability, plasticity and board life, while unexpectedly also having advantageously low levels of entrained air. The additives of the invention enable the masonry cement producer to obtain these desired properties without replacing the limestone component of the masonry cement with more costly lime.

The additives of the present invention can be conveniently added during the grinding process as a single, stable additive, thus reducing the risk of overdosing. The additives of the invention may be provided in aqueous solution, and thus are stable for long periods of storage, even when subjected to extreme temperature excursions and cycling.

The additives of the invention comprise a salt of stearic acid; a set retarding carbohydrate; an ethylenic glycol selected from the group consisting of mono-, di-, tri-, and tetraethylene glycols; and a cellulose ether. In a preferred embodiment of the invention the additive is provided in aqueous solution.

In a preferred embodiment of the invention, the additive comprises from about 10 to 50 weight percent of the stearic salt, which is preferably calcium stearate; from about 10 to 30 weight percent of the set retarding carbohydrate, which is preferably sucrose; from about 15 to 50 weight percent of the ethylenic glycol selected from the group consisting of mono-, di-, tri- and tetraethylene glycols, which is preferably diethylene glycol; and from about 2 to 40 weight percent cellulose ether, all based on the total solids in the composition.

In its method aspects, the present invention relates to a method which comprises intergrinding a Portland cement with an additive of the invention. The invention further relates to masonry cement compositions comprising a masonry cement binder and an additive of the invention.

DETAILED DESCRIPTION OF THE INVENTION

The additive compositions of the invention comprise a salt of stearic acid; a set retarding carbohydrate; an ethylenic glycol selected from the group consisting of mono-, di-, tri-, and tetraethylene glycols; and a cellulose ether.

The stearic salt component of the invention may be any salt of stearic acid, or mixture thereof, which, at an effective level of addition, does not deleteriously affect the properties of the masonry cement. By "effective level of addition", it is meant an amount of the salt which, in the additive composition, imparts a measurable level of water-repellancy to the masonry cement. At high levels of addition the cationic component of certain stearate salts, such as sodium and magnesium stearate, may react adversely with the masonry cement; thus it is generally preferred, if these salts are used, that they be present in the additive at a level of less than about 5 weight percent. Preferred stearate salts are calcium stearate and aluminum stearate, with calcium stearate most preferred. When calcium stearate is used, it is preferably introduced into the additive composition in the form of an aqueous suspension. Aqueous suspensions of calcium stearate may be formed using conventional methods, e.g. by heating stearic acid and lime powder. A particularly preferred calcium stearate suspension is commercially available from W. R. Grace & Co.-Conn. under the tradename DARAPEL®. However, if desired, the calcium stearate may be incorporated into the additive alone. This is generally not preferred, as the calcium stearate powder, if not very finely ground, may be difficult to disperse in the additive, and may settle when the additive is stored. Where the salt is other that sodium or magnesium, it is preferred that the stearic salt be present in the composition at a level of from about 10 to 50 weight percent solids on solids; a particularly preferred level is from about 15 to 25 weight percent. When calcium stearate is provided as an aqueous suspension, it is usually preferred that the concentration of calcium stearate in the suspension be from about 40 to 60%.

The term "set retarding carbohydrate" as it is used herein includes polysaccharides, disaccharides, monosaccharides, and derivatives thereof. Examples of these which may be used in the invention include but are not limited to maltose, dextrose, sucrose, glucoheptonates, fructose, and gluconates. Sucrose is particularly preferred because of its wide availability and low cost. However, any carbohydrate may be used which, in the additive composition, provides set retardation to the masonry cement. The level of polysaccharide used in the additive will depend upon the polysaccharide which is chosen and the level of set retardation which is desired. However, levels of from about 10 to 40 weight percent, solids on solids, are preferred. When sucrose is chosen as the polysaccharide component it is generally preferred that it be present in an amount of from about 15 to 5 weight percent, solids on solids, and most preferably from about 20 to 30 weight percent.

The ethylenic glycol component of the additive is selected from the group consisting of mono-, di-, tri-, and tetraethylene glycols and mixtures thereof. It has been found that the higher the ethylenic glycol, the higher the levels of air entrainment in the masonry cement containing the additive. Thus, in order to obtain the desired low levels of air entrainment of the invention, the glycol is selected from mono- to tetraethylene glycols. Although additives of the invention containing monoethylene glycol entrain the least air in the masonry cement, they are also the least effective grinding aids. (Additives which, when added during the cement grinding operation improve the grinding efficiency by reducing the amount of energy required to obtain the desired particle size, are known in the art as "grinding aids".) Thus, for an optimal balance of low air entrainment and good grinding efficiency, di- or triethylene glycol are preferred, and diethylene glycol is most preferred. It is generally preferred that the ethylenic glycol be present in amounts of from about 15 to 50 weight percent, solids on solids, and most preferably from about 40 to 50 weight percent.

As discussed hereinabove, cellulose ethers have been added to masonry cements in the past to improve the workability of these cements, with the accompanying disadvantage of increasing the level of air entrainment in the cement composition. Unexpectedly, it has been found that when cellulose ethers are added to masonry cements in the additive compositions of the invention, the resulting masonry cement compositions have very low levels of entrained air. Preferred cellulose ethers for use in the invention are commercially available from Dow Chemical Co., under the tradename METHOCEL®; particularly preferred among these is METHOCEL® K4M. It is generally preferred that the cellulose ether be present in an amount of from about 2 to 10 weight percent, solids on solids, and most preferably from about 2 to 4 weight percent.

The components of the additives of the invention may be added and mixed in any desired order using conventional mixing equipment. It is generally preferred that the cellulose ether be added last, so that it may be completely dispersed, after all other additives are mixed.

Additional conventional additives may be added to the additives of the invention, provided that they do not deleteriously affect the properties of the cement product.

The invention is further directed to a method of producing a masonry cement comprising the step of intergrinding cement clinker, or cement clinker and limestone, with an additive according to the invention. It is preferred that the additives of the invention be present during intergrinding at a level of from about 0.001 to about 0.3 percent by weight of additive solids based upon the weight of the cement. The additives of the invention, if prepared in concentrated form, may ideally be dispersed in a greater proportion of water before addition to the cement, such that they may be accurately and completely dispensed into the cement.

The present invention is also directed to cementitious compositions comprising a masonry cement which comprises Portland cement clinker and limestone, and an additive of the invention. The additive of the invention is preferably present in the masonry cement composition at a level of from 0.01 to 1 weight percent based on the total weight of the masonry cement binder. In one embodiment of the invention the masonry cement composition has a water retention of at least 70% and a 7 day compressive strength of at least 500 psi.

The following example is intended to be illustrative only and not of limiting effect. While preferred embodiments of the invention have been described herein, other variations and modifications may be practiced by those skilled in the art without departing form the spirit and scope of the invention.

EXAMPLE 1

An additive of the invention was made according to the formulation shown in Table 1.

TABLE 1

| Component | Weight | Weight % (Solids/Solids) |
|---|---|---|
| DARAPEL ® additive | 25 | 23 (Calcium Stearate) |
| Water | 75 | — |
| Diethylene Glycol | 25 | 46 |
| Sucrose | 15 | 28 |
| Methocel ®K4M Cellulose Ether Additive | 1.5 | 2.8 |

The calcium stearate suspension, DARAPEL ®, was first charged to the mixer. To this was added 75 parts water with stirring. The diethylene glycol was then added and mixed well, after which the sucrose was added and the mixture stirred until the sucrose was completely dissolved. The cellulose ether, METHOCEL ® K4M, was then gradually added to this mixture and stirred until completely dissolved.

The resulting additive was then separated into two portions and interground with two Portland masonry cements each comprising 1750 grams of crushed clinker (20 mesh), 1645 grams of crushed limetone (20 mesh), and 105 grams of crushed gypsum, at a level of 0.1% solids of the additive based on total solids. The two cements differed only in the type of cement clinker used, (clinkers 1 and 2, labeled as Samples 1 and 2 in Table 2). Identical masonry cement compositions containing clinkers 1 and 2 were interground with 0.1%, solids on solids, of an emulsion additive, HYDROPHOBE ®, CR 3.3 (available from W. R. Grace & Co -Conn.). These samples are labeled samples 1a and 2a respectively in Table 2.

The grinding mills were operated for 14,400 revolutions at 230 degrees F. 420 grams of each resulting ground cement producty was then mixed with 720 g of graded sand, 720 g of 20/30 sand, and sufficient water to produce a flow of 110+/−5 according to ASTM C-91 tests for masonry cements (mortars).

The resulting masonry cements were then tested for percent air entrainment (ASTM-C-91); compressive strength after 7 and 28 days set (ASTM-C-91); water retention (ASTM-C-91), a measure of the workability of the cement; and Gillmore (ASTM-C-91), a measure of the setting time of the cement. Prior to addition of the water, the dry cement mortar was tested for Blaine Fineness of Grind (ASTM-C-204), a measure of the grinding aid effect of the additive. The results of the testing are shown in Table 2.

The data of Table 2 shows that the non-emulsion additive of the invention provides a better grinding aid effect, as measured by the Blaine Fineness; significantly lower air entrainment, with correspondingly better compressive strengths; and advantageously long set times. The additive of the invention provides masonry cements having water retentions similar to those provided by the emulsion additive, indicating that the two additives impart equal workability to masonry cements.

TABLE 2

| Sample Number | Blaine Fineness (cm²/g) | % Entrained Air | Gillmore Init./Final (Mins) | Compressive Strength (psi) | | Water Retention (%) |
|---|---|---|---|---|---|---|
| | | | | 7 day | 28 day | |
| 1 | 7240 | 10.5 | 225/345 | 2510 | 3010 | 80 |
| 1a | 6660 | 17.7 | 75/300 | 1620 | 2260 | 79 |
| 2 | 7020 | 9.9 | 205/365 | 2240 | 3000 | 79 |
| 2a | 6540 | 16.2 | 60/300 | 1750 | 2100 | 76 |

What is claimed is:

1. A masonry cement additive in non-emulsion form comprising:
   a) a salt of stearic acid;
   b) a set retarding carbohydrate;
   c) an ethylenic glycol selected from the group consisting of mono-, di-, tri-, and tetraethylene glycol, and mixtures thereof; and
   d) a cellulose ether,
   wherein the stearic acid salt is present in an amount of from about 10 to 50 weight percent, solids on solids.

2. The additive of claim 1 wherein the set retarding carbohydrate is present in an amount of from about 20 to 30 weight percent, solids on solids.

3. The additive of claim 1 wherein the ethylenic glycol is present in an amount of from 40 to 50 weight percent, solids on solids.

4. The additive of claim 1 wherein the cellulose ether is present in an amount of from 2 to 4 weight percent, solids on solids.

* * * * *